(12) United States Patent
Smith et al.

(10) Patent No.: US 7,945,724 B1
(45) Date of Patent: May 17, 2011

(54) NON-VOLATILE SOLID-STATE MEMORY BASED ADAPTIVE PLAYLIST FOR STORAGE SYSTEM INITIALIZATION OPERATIONS

(75) Inventors: Randall D. Smith, Arlington, MA (US); Daniel J. Ellard, Belmont, MA (US)

(73) Assignee: NetApp, Inc., Sunnyvale, CA (US)

( * ) Notice: Subject to any disclaimer, the term of this patent is extended or adjusted under 35 U.S.C. 154(b) by 601 days.

(21) Appl. No.: 12/028,717

(22) Filed: Feb. 8, 2008

Related U.S. Application Data

(63) Continuation-in-part of application No. 11/740,870, filed on Apr. 26, 2007.

(51) Int. Cl.
*G06F 12/00* (2006.01)

(52) U.S. Cl. ........ 711/103; 711/100; 711/102; 711/154; 713/2; 365/185.33; 365/230.03

(58) Field of Classification Search .................. 711/100, 711/102, 103, 154; 713/2; 365/185.33, 230.03
See application file for complete search history.

(56) References Cited

U.S. PATENT DOCUMENTS

| | | | |
|---|---|---|---|
| 5,568,629 A | 10/1996 | Gentry et al. | |
| 5,778,411 A | 7/1998 | DeMoss et al. | |
| 5,864,655 A | 1/1999 | Dewey et al. | |
| 5,889,934 A | 3/1999 | Peterson | |
| 5,999,930 A | 12/1999 | Wolff | |
| 6,061,770 A | 5/2000 | Franklin | |
| 6,260,120 B1 | 7/2001 | Blumenau et al. | |
| 6,289,356 B1 | 9/2001 | Hitz et al. | |
| 6,421,684 B1 | 7/2002 | Cabrera et al. | |
| 6,757,694 B2 | 6/2004 | Goodman et al. | |
| 6,757,695 B1 | 6/2004 | Noveck et al. | |
| 6,792,518 B2 | 9/2004 | Armangau et al. | |
| 6,912,548 B1 | 6/2005 | Black | |
| 7,111,147 B1 | 9/2006 | Strange et al. | |
| 7,127,577 B2 | 10/2006 | Koning et al. | |
| 7,237,021 B2 | 6/2007 | Penny et al. | |
| 7,562,078 B1 | 7/2009 | Yadav et al. | |
| 7,607,000 B1 * | 10/2009 | Smith et al. ...................... 713/1 |
| 7,702,795 B2 | 4/2010 | Weisman et al. | |
| 2001/0047482 A1 | 11/2001 | Harris et al. | |
| 2004/0068636 A1 | 4/2004 | Jacobson et al. | |
| 2004/0103104 A1 | 5/2004 | Hara et al. | |
| 2005/0204108 A1 | 9/2005 | Ofek et al. | |

(Continued)

OTHER PUBLICATIONS

Non-Final Office Action Mailed Apr. 13, 2010 in Co-Pending U.S. Appl. No. 11/740,870, filed Apr. 26, 2007.

(Continued)

*Primary Examiner* — Jasmine Song
(74) *Attorney, Agent, or Firm* — Perkins Coie LLP

(57) ABSTRACT

An initialization process in a storage server is made more efficient by at least partially avoiding serial and/or sequential access to the data blocks that are needed for such process. To accomplish this, the blocks needed for the initialization process are identified prior to performing the initialization process. The blocks or a list of references to the blocks are stored in a non-volatile solid-state memory, such as a flash-based memory, that is separate from the main drive subsystem and has a much shorter power-up and read-access time than the main drive subsystem. The list or stored set of blocks may be used to access the blocks more efficiently when needed, by accessing two or more of such blocks in parallel, as well as performing block accessing and volume mounting in parallel.

36 Claims, 9 Drawing Sheets

U.S. PATENT DOCUMENTS

2005/0278478 A1    12/2005    Takeda et al.
2007/0088702 A1    4/2007    Fridella et al.

OTHER PUBLICATIONS

Gal, E. and Toledo, S. 2005. Algorithms and data structures for flash memories, *ACM Comput. Surv.* 37, 2 (Jun. 2005), 138-163.

Perumal, et al., "A Tutorial on RAID Storage Systems", Data Network Architectures Group, University of Cape Town, South Africa, pp. 1-23 (May 6, 2004).

Co-pending U.S. Appl. No. 11/740,870, filed Apr. 26, 2007.

Final Office Action mailed Dec. 11, 2009 in Co-pending U.S. Appl. No. 11/740,870, filed Apr. 26, 2007.

Non-Final Office Action mailed May 28, 2009 in Co-pending U.S. Appl. No. 11/740,870, filed Apr. 26, 2007.

EMC Press Release, "EMC²® Where Information Lives®, EMC in Major Storage Performance Breakthrough; First with Enterprise-Ready Solid State Flash Drive Technology", http://www.prnewswire.com/mnr/emc/31368, 3 pages, Webcast: David Donatelli Discusses EMC's Latest Storage Innovation (Jan. 14, 2008).

EMC Data Sheet, "EMC Symmetrix DMX Series, The World's Most Trusted Storage Platform", 8 pages (2008).

Russinovich, Mark, "Windows Administration: Inside the Windows Vista Kernel: Part 2" http://www.microsoft.com/technet/technetmag/issues/2007/03/VistaKernel.

Final Office Action Mailed Aug. 23, 2010 in Co-pending U.S. Appl. No. 11/740,870, flied Apr. 26, 2007.

Advisory Action Mailed Mar. 8, 2010 in Co-Pending U.S. Appl. No. 11/740,870, filed Apr. 26, 2007.

"Data ONTAP™ 5.2 System Administrator's Guide, Snapshots", Chapter 10, Network Appliance, Inc. (Sep. 1998) pp. 259-280.

"Storage Solutions, FlexVol™ and FlexClone™ Software", Network Appliance, Inc. (2004) Two (2) pages.

"Understanding aggregates and volumes, The physical layer of Data ONTAP data storage—aggregates, plexes, RAID groups, and LUNs", gFiler™ Gateway Series, Planning Guide, Chapter 4: Planning for Storage Management, Network Appliance, Inc. (Oct. 19, 2004), pp. 1-7.

Fisch, M., "NetApp FlexVol and FlexClone Raise the Rate of Return on Storage Resources", The Clipper Group Navigator™, (Nov. 15, 2004), Report #TCG2004094, pp. 1-3.

Office Action received in U.S. Appl. No. 11/740,870; mailed Dec. 11, 2009.

Advisory Action Mailed Oct. 29, 2010 in Co-Pending U.S. Appl. No. 11/740,870, filed Apr. 26, 2007.

\* cited by examiner

NON-VOLATILE SOLID-STATE MEMORY BASED ADAPTIVE PLAYLIST FOR STORAGE SYSTEM INITIALIZATION OPERATIONS

This is a continuation-in-part of U.S. patent application Ser. No. 11/740,870 of D. Grunwald et al., filed on Apr. 26, 2007, which is incorporated herein by reference.

FIELD OF THE INVENTION

At least one embodiment of the present invention pertains to network storage systems, and more particularly, to a technique for facilitating initialization operations in a network storage system.

BACKGROUND

A storage server is a special purpose processing system used to store and retrieve data on behalf of one or more clients on a network. A storage server operates on behalf of one or more clients to store and manage data in a set of mass storage devices, such as magnetic or optical storage-based disks or tapes. In conventional storage systems, the mass storage devices may be organized into one or more groups of drives (e.g., redundant array of inexpensive disks (RAID)). These drives, in turn, define an overall logical arrangement of storage space, including one or more storage volumes. A storage volume is any logical data set that is an abstraction of physical storage, combining one or more physical storage devices (e.g., drives) or parts thereof, into a logical storage object.

A conventional storage server includes a storage operating system, which may implement a file system to logically organize data on the drives. A file system is a structured (e.g., hierarchical) set of stored data, such as directories and files, blocks and/or any other type(s) of logical data containers (hence, the term "file system", as used herein, does not necessarily include "files" in a strict sense). Data stored by a storage server may be stored in the form of multiple blocks that each contain data. A block is the basic unit used by a file system in a storage server to manipulate and transfer data and/or metadata. In many system, a block size of 4 KBytes is used, although other block sizes can also be used.

A storage server may implement various features and functions, such as the generation of certain kinds of data storage images. Image generation may, for example, include mirroring (a technique in which a mirror copy of certain data at one location is maintained at another location), creation of snapshots and/or clones of storage volumes, etc. Mirroring of data may be done for various different purposes. For instance, mirroring provides a mechanism for ensuring data availability and minimizing down time, and may be used to provide disaster recovery. In addition, snapshots provide point-in-time images of data, and clones generally provide a writeable image of data, which may be used for various purposes in data operations.

Conventional storage servers boot up (initialize) after the power is turned on, before they can be used. To accomplish boot up, various metadata is first required by the storage server and is therefore retrieved from specific blocks of storage. In the prior art, these different blocks were typically retrieved in a serial and/or sequential manner, because these blocks are generally interdependent (e.g., by referencing each other in a hierarchical manner). For example, a first block may be referenced by a second block, etc. Thus, during boot up, the second block would have to be retrieved before the first, etc. Such sequential input/output (I/O) access pattern (i.e., the need to access the blocks in a particular order) constrains the speed with which the blocks can be retrieved and boot up completed. Yet in many applications, particularly enterprise scale storage systems, fast boot up time is essential for meeting users' expectations. Boot-up latency is further exacerbated by the larger number of blocks that are typically required during boot up in more advanced (complex) storage servers, i.e., with the incorporation of more features and functions.

A similar latency problem can occur in the context of other types of initialization processes of a storage server. For example, latency associated with retrieving needed metadata blocks can also be problematic in the context of failover/giveback. "Failover" occurs when one storage server takes over responsibilities of another storage server which has experienced the failure. "Giveback" is the process by which a failed storage server resumes its responsibilities after recovering from the failure. As with boot up, failure/giveback processes often require the retrieval of an initial set of interdependent blocks.

Failover/giveback techniques can be used for both masking server failures from clients and also to provide nondestructive upgrades where individual servers in a cluster are taken offline, upgraded, and brought back online with minimum perceptible impact on the clients. For some applications, performing these operations quickly is critical to correct and successful functioning. For example, if the delay for failover or giveback is longer than some fixed interval, client requests will time out, resulting in application failures. Therefore, it is important to perform these operations as quickly as possible.

Latency associated with retrieving needed metadata blocks can also be problematic when mounting a storage volume (or simply, "volume"). "Mounting" a volume is the process of making the volume accessible to the file system (and, hence, the user). Mounting a volume involves the attachment of the file system to the file/directory hierarchy. Mounting a volume, like boot up and failure/giveback processes, often requires the loading of an initial set of interdependent blocks. In situations where multiple storage volumes are to be mounted, the latency associated with mounting is compounded.

Other types of initialization processes may also be subject to similar latency concerns.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
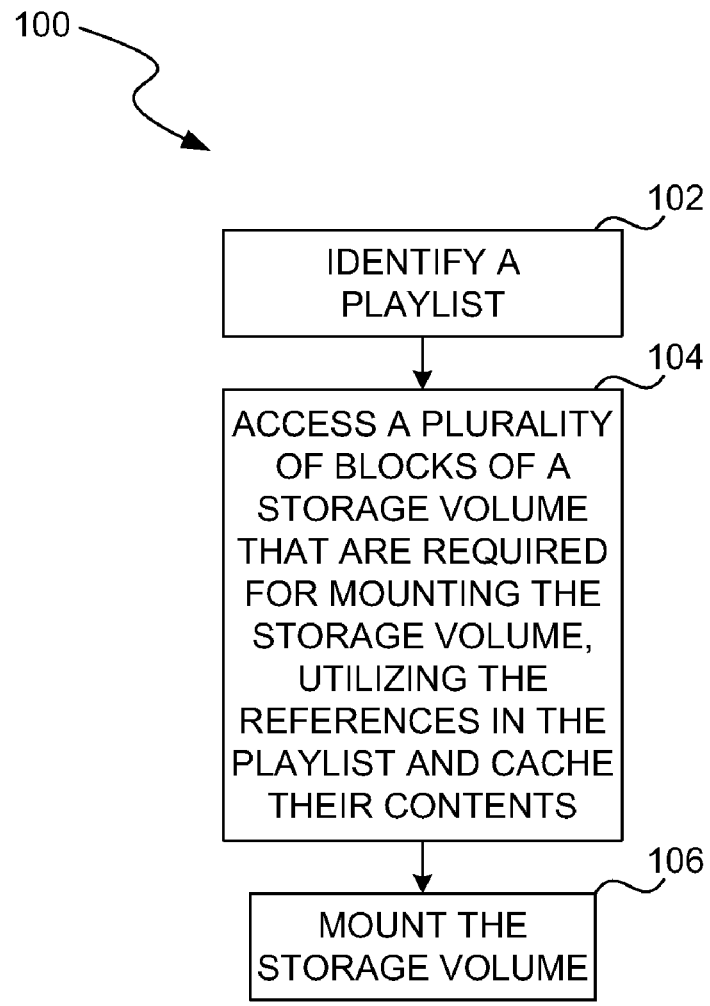
FIG. 1 illustrates a method for mounting a storage volume, in accordance with one embodiment.

A technique for using an adaptive playlist to facilitate initialization operations in a storage system is described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

According to the techniques introduced here, any of various types of initialization processes (e.g., system boot-up, failover/giveback, volume mounting) can be performed more efficiently, in a storage server or other type of processing system, by at least partially avoiding the need to access the blocks needed for such processes in a particular order (e.g., the interdependent blocks mentioned above in the Background section). To accomplish this, a list can be generated prior to execution of the initialization process, for later use in the initialization process. In some embodiments, the list includes a plurality of block references (pointers) that can be used to access corresponding blocks required for the initialization process. Such list is henceforth referred to as a "playlist", although the terms "list" and "playlist" are used herein interchangeably.

The playlist can be stored in any accessible location. In certain embodiments, the playlist is stored (e.g., cached) in a non-volatile solid-state memory, such as a flash-based memory, which is separate from both the main memory ("buffer cache") of the storage server and the main storage subsystem, and which has a much shorter power-up and read-access time than the main storage subsystem. The playlist can thereby be accessed and used very quickly during the initialization process.

In some embodiments, the actual blocks needed for initialization are cached to expedite subsequent access to those blocks during initialization. For example, the blocks needed for initialization can be stored in the above-mentioned solid-state memory.

The playlist, or the actual blocks, if cached as mentioned above, can be used to access the blocks more efficiently during an initialization process, by accessing two or more of such blocks in parallel, as well as by performing block accessing and volume mounting in parallel. For instance, mounting of a storage volume may be initiated prior to the block accesses being complete. Hence, by employing this technique, the amount of time it takes to boot up a storage server, mount a volume, or perform any other initialization operation, can be reduced.

The playlist (or the actual blocks, if cached) can be updated based on file system operations that modify any of the blocks. This might be necessary, for example, to reflect the enabling or disabling of various features (e.g., snapshot, mirror, clone) for a particular volume. The playlist can be provided and used in association with a file system independent of the software (e.g., a version thereof) that is used to read/write the blocks.

In some embodiments, and under certain conditions, when file system operations cause one or more of the blocks needed for initialization to change or be replaced, only the changes are stored in the solid-state memory, rather than the new or modified blocks. This may include, for example, storing updated block references or other metadata reflecting the changes in the solid-state memory.

The block references mentioned herein can be logical block references (sometimes called "virtual" block references), physical block references, or both. In some embodiments, both logical block references and physical block references are used and are mapped to each other by the file system of the storage server. By using this feature, a block can be modified or moved by altering its physical block reference without modifying the corresponding logical block reference. In some such embodiments, when a block needed for initialization is modified, only the resulting change in the logical-to-physical block mapping is saved to the solid-state memory, rather than the modified block.

For purposes of illustration, the techniques introduced here are now described in the context of mounting a volume. Note, however, that the same basic approach can also be applied to other contexts, such as booting up a computer (e.g., a storage server), failover/giveback, or any other type of initialization operation.

FIG. 1 illustrates a method 100 for mounting a storage volume, in accordance with one embodiment. "Mounting", as the term is used herein, is any process by which a volume or other form of logical data container is made accessible to a user. Of course, mounting can be repeated as necessary (e.g., after un-mounting), and may thus include re-mounting a volume.

The physical storage device(s) underlying a storage volume may vary in different implementations, examples of which will be set forth in the context of different embodiments described below. In some instances, a storage volume as described herein can be flexibly associated with the underlying physical storage device(s). In other instances, a storage volume as described herein can be mapped directly and inflexibly to the underlying physical storage device(s).

A "file system", as the term is used herein, is any organization of data in a structured manner, where the data can be, but is not necessarily, organized in terms of files and/or structured hierarchically.

The method of FIG. 1 is, in certain embodiments, performed by a file system manager module of a storage server, which is any component of a storage system that manages a file system. With reference to FIG. 1, a playlist is first identified at 102. As used herein, a "list" or "playlist" is any data structure capable of storing the block references each of which, in turn, includes any object that is capable of identifying or being used to identify at least one block (i.e., any set of data) in an associated storage volume. For example, in various embodiments, the block references may include logical block references, physical block references, or both.

The playlist may be stored in the storage volume or in any other accessible location. Further, the playlist may be linked or otherwise associated with a particular storage volume. Thus, in some embodiments, the playlist may be identified by first identifying the storage volume to be mounted in response to an automated or manual mounting request, and then locating the corresponding playlist (e.g., via a pointer). Of course, the playlist may be identified in any desired manner.

Next, at 104 the block references are used to access the blocks required for mounting the storage volume, and their contents are cached. In one embodiment, such block references may each refer to (or be used to identify) a location of a corresponding block in the storage volume that is required for mounting the storage volume. Thus, such location may, in turn, be used to retrieve the associated block, thus making the block accessible.

The storage volume is then mounted at 106 utilizing the playlist. As mentioned above, mounting refers to creating an association of a file system with a file hierarchy, to make the file system accessible.

In various embodiments, a plurality of the blocks may be accessed before and/or during the mounting. For example, before completing the accessing of each of the blocks, mounting of the storage volume may be initiated. To this end, the block accessing and storage volume mounting may be performed in parallel. Further, a plurality of the blocks may even be accessed in parallel. In operation, such features may optionally be used to avoid, at least in part, the need to access blocks in a particular order, even when block interdependencies exist. The time required to mount the storage volume may thereby be reduced.

As another option, efficiency may be further increased by organizing the manner in which the blocks are accessed, to further reduce latency. For example, the block references may be utilized to access the blocks in a predetermined order. This may be accomplished by automatically processing the playlist to reflect the predetermined order, prior to the playlist being utilized to access the blocks. To this end, certain blocks may be accessed before or simultaneously (e.g., batched) with others to more efficiently obtain the information required for mounting.

In one embodiment, the predetermined order may be configured to ensure that blocks that are required first in the mounting process are accessed prior to other blocks which are required later in the process. To this end, the mounting process may be initiated faster, as will be elaborated upon below.

In another embodiment, the predetermined order may be configured to optimize input/output (I/O) bandwidth. Specifically, the order of the block references may be configured to group certain block references together, so that the corresponding blocks are accessed as one or more groups. I/O from a storage subsystem may thus be optimized, since the number of I/O requests may be reduced, and larger chunks of data may be requested from a physical storage device in each individual request, effectively improving the I/O performance of the system (e.g., by reducing the impact of physical storage device seek times).

In still additional embodiments, the blocks may even be accessed from one or more physical storage devices (e.g., flash memory or disk drives) prior to mounting, such that the blocks may be cached. Thus, during mounting, the blocks may be accessed directly from cache, instead of the physical storage devices. This may further reduce any latency required during mounting. More detail regarding a different embodiment that incorporates similar pre-processing/caching features is provided below with reference to FIG. 2. As an option, the aforementioned playlist may be used to avoid a situation where the same block is read more than once (e.g., once for each storage volume), which would otherwise result in redundant I/O. By utilizing the playlist and the aforementioned caching, a feature may be provided for ensuring that each block is read only once.

In different illustrative embodiments, the playlist may be generated and even updated based on various additional factors. For example, it may be determined whether any change has been made in the configuration of various features (e.g., a snapshot, a mirror, a clone), in association with blocks referenced in the playlist. Such change may refer to, for example, enabling, disabling, modifying, etc. such features. Specifically, some features, by their nature, result in corresponding blocks remaining unmodified (e.g., neither written to nor moved). Further, such features may share blocks with an active file system which modifies blocks in a frequent manner.

In one embodiment, the playlist may be managed with such features taken into account so that, for example, movement of a shared block does not impact a feature associated with the block More detail regarding a different embodiment that incorporates a similar feature is set forth below with reference to FIG. 3.

The playlist may also be adaptive in nature. For example, if any change (e.g., a write) in a file system results in a modification to a block referenced in the playlist (e.g., by adding, deleting, changing at least one block that may be associated with a file), the playlist may be updated to reflect the change. Other embodiments in which the playlist is adaptive in nature may involve copy-on-write (COW) snapshots, defragmenters, etc. More detail regarding a different embodiment that incorporates a similar feature is set forth below with reference to FIG. 4.

More detail will now be set forth regarding various optional architectures and features of different embodiments with which the technique introduced here can be implemented. Note that any of the following features may be incorporated with or without the other features described.

Figure 2:
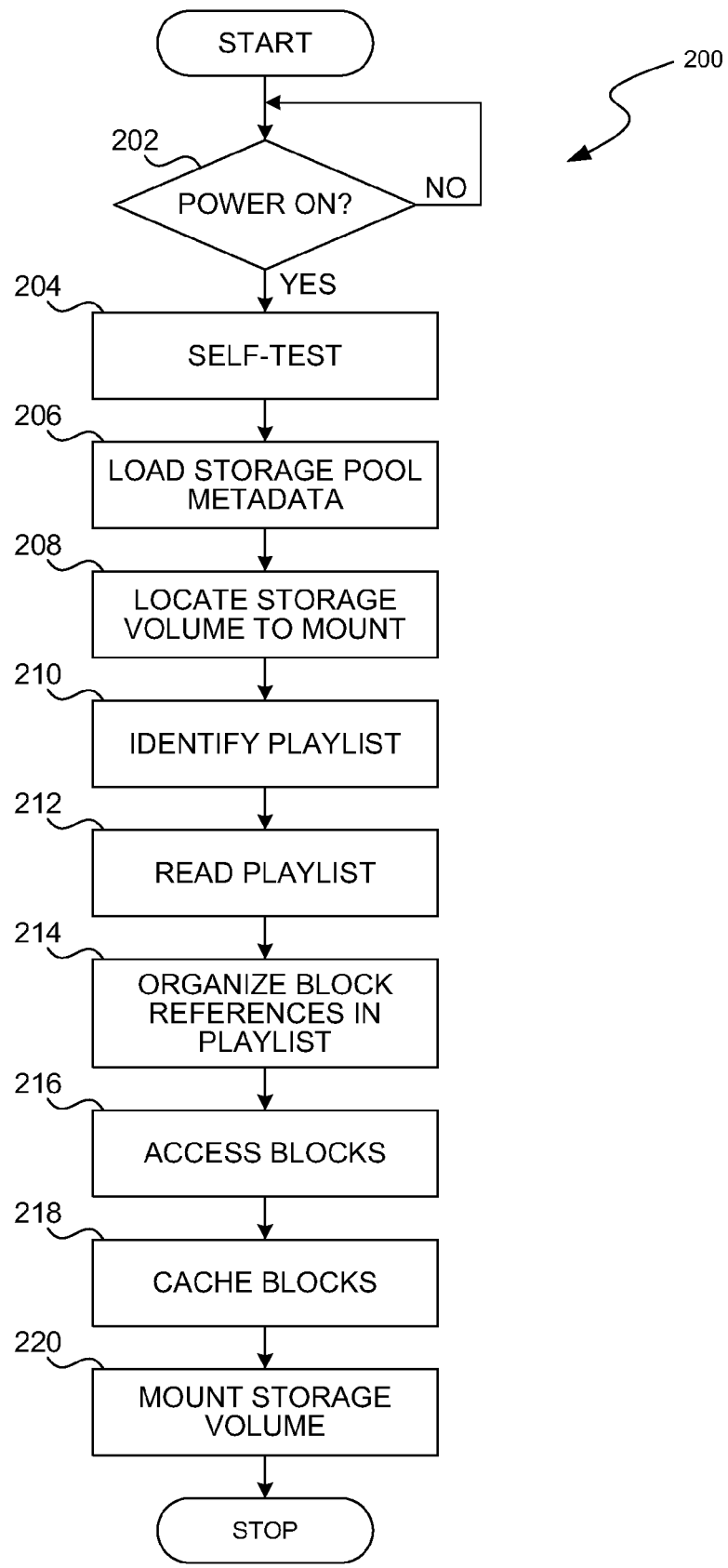
FIG. 2 illustrates a boot-up sequence that results in a storage volume being mounted, in accordance with another embodiment.

FIG. 2 illustrates a boot-up sequence 200 that can be performed by a storage server, which results in a storage volume being mounted, in accordance with an embodiment of the invention. The boot-up sequence 200 can be carried out in the context of the method 100 of FIG. 1. Of course, however, the boot-up sequence 200 can be used in any desired environment. For example, the boot-up sequence 200 can reflect one associated with a file system environment.

As shown, it is first determined at 202 whether a device has been powered-on. In one embodiment, the decision 202 may be made based on an inspection of a power state of the storage server and/or the receipt of a power-on signal, for example. Once a power-on situation has occurred, a self-test is performed at 204. The metadata for a storage pool is then loaded into main memory of the storage server (e.g., by retrieving it from disk) at 206. One or more storage volumes to be mounted are then located at 208. For example, the storage volume(s) may be located by referencing a network map or the like at a storage server that indicates the locations of different storage volumes, etc. Such storage volume(s) may include any of those that are to be made accessible after boot-up.

The file system manager then identifies a playlist associated with each such storage volume at 210. As mentioned above, the playlist may be linked or otherwise associated with the storage volume located at 208. Thus, in one embodiment, the playlist may be identified by first identifying the storage volume to be mounted, and then locating the corresponding playlist (e.g., via a pointer). It should be noted that the playlist may be stored in any desired location (other than in the storage volume itself), examples of which will be set forth during reference to FIG. 5.

The playlist may be in the form of a file or any other data structure capable of maintaining the playlist and being associated with the corresponding storage volume in some manner. Further, the playlist may be created/updated in any desired manner, examples of which are set forth below in the context of reference to FIGS. 3 and 4.

Upon identifying the playlist, the playlist is read by the file system manager at 212. The following illustrates an example of a playlist that includes a plurality of physical block references, in accordance with one possible embodiment:

Physical Block Number 8
65

100
102
250
1010

While other more complex arrangements (e.g., tree structures) are contemplated, the playlist can include a simple ordered set of block references. As set forth above, each of the block references may refer to a location where a corresponding block may be found.

In various other embodiments involving a storage volume, the foregoing playlist may be augmented to include not only physical block locations, but logical block references as well. The following illustrates a playlist containing both logical and physical block references, in accordance with another embodiment:

| Logical Block Number | | Physical Block Number |
|---|---|---|
| 72 | ←→ | 8 |
| 44 | ←→ | 65 |
| 10448 | ←→ | 100 |
| 5442 | ←→ | 102 |
| 3310 | ←→ | 250 |
| 42218 | ←→ | 1010 |

As set forth above, the logical block references may be mapped to various physical block references.

As mentioned above, the block references may be used to access blocks required for mounting the storage volume. Such information may include information specific to a particular file system i.e., file system specific information. One example of a particular file system is one in which modified blocks are written to different (new) locations on disk, such as the WAFL® file system of Network Appliance, Inc., of Sunnyvale, Calif. File system-specific information that may be stored in the referenced blocks can include, for example, file system metadata.

Of course, such information contained in the referenced blocks may include any information that is required for mounting an associated storage volume. For instance, in a particular file system, blocks may be referenced which include any information required to initiate any desired I/O (e.g., block access requests/block retrievals) or to carry out any other functionality in association with storage volume mounting.

Referring back to FIG. 2, the block references in the playlist may be organized by the file system manager to control various I/O at 214. Such organization may result in the block references being positioned in a predetermined order. As mentioned earlier, such predetermined order may be configured to optimize I/O bandwidth, etc.

After such organization, the block references are used by the file system manager to retrieve the corresponding blocks from one or more physical storage devices underlying the storage volume at 216. In one embodiment, such as where the playlist takes the form described above, the blocks may be organized in a way to make block accesses more efficient.

For example, prior to being accessed at 216, the physical block references may be modified (e.g., by re-organizing, re-ordering) without necessarily modifying the logical block references. Specifically, in one embodiment, a plurality of blocks are read from a first set of un-contiguous physical locations and then re-written to a second set of contiguous physical locations, thus enabling a more efficient subsequent retrieval of the blocks. In the context of the above table, such technique may result in the re-organization or re-ordering of the illustrated physical block locations. The aforementioned contiguous physical locations may therefore be referred to as an extent (e.g., starting address and length).

Such optimization can be accomplished without necessarily making any changes to the logical block references. To this end, the physical location modifications may be made transparent to a file system, and the logical block references may be managed more flexibly regardless of whether the corresponding physical location(s) was/were originally allocated to the storage volume.

As an additional option, prior to mounting, the blocks accessed at 216 can be cached in a buffer at 218. With the necessary block(s) accessed, the storage volume mounting is initiated at 220. Thus, by caching the blocks at 218, the blocks may be accessed directly from the buffer, instead of one or more drives, for example. This may further reduce any latency associated with mounting.

As mentioned above, the block references may be organized into a predetermined order to ensure that blocks that are needed first in the mounting process are retrieved prior to other blocks which are needed later in the process. For example, various metadata (e.g., information describing previous instances of a snapshot, a mirror, a clone) are required before mounting and therefore must be first retrieved from specific blocks in the associated storage volume. By using this predetermined order, contrary to the appearance of the flow in FIG. 2, the subsequent mounting operation 220 may be initiated before operations 216 and/or 218 are completed. In other words, as soon as a first required block is accessed and cached, mounting 220 can begin to further reduce latency.

Figure 3:
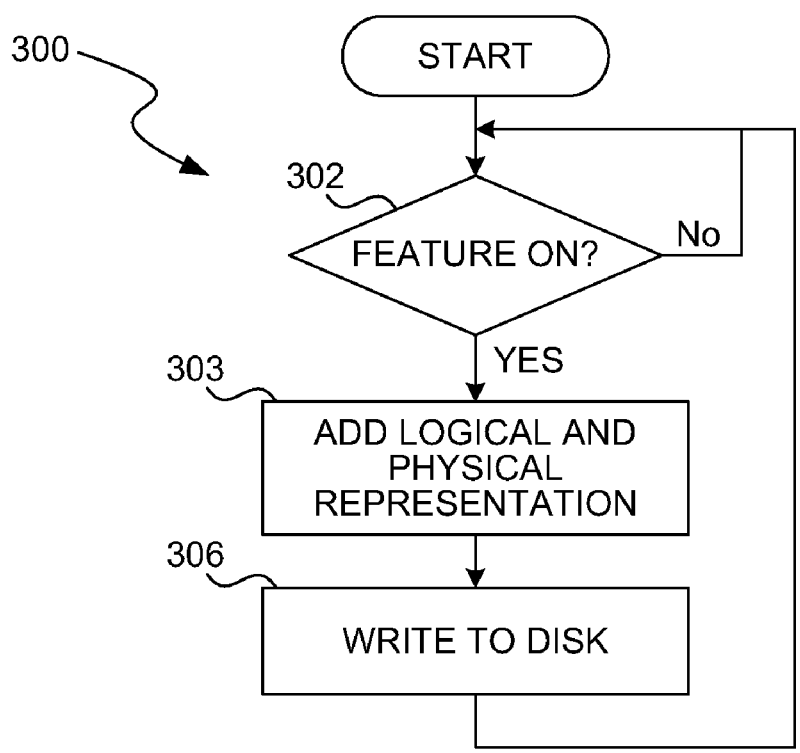
FIG. 3 illustrates a method for generating/updating a playlist utilizing an application program interface (API), in accordance with another embodiment.

FIG. 3 illustrates a method 300 for generating or updating a playlist utilizing an application program interface (API), in accordance with an embodiment of the invention. The method 300 can be carried out to generate or update a playlist prior to its use in the context of the methods of FIGS. 1 and 2. Of course, however, it should be noted that the method 300 can be used in any desired environment.

As mentioned earlier, the playlist may be created in any desired manner. For example, the playlist may be created whenever an associated storage volume is created. In another embodiment, a storage volume may be first mounted for the specific purpose of using a recorder feature to track and log which block requests are made for such mounting. Such recorder feature may include software that resides, for example, at the storage server for monitoring the block requests for the specific purpose of identifying block reference locations from which the requested blocks are being retrieved. The identified block references may be saved in a playlist for use during a subsequent instance of mounting. By using this approach, the playlist may be provided and used in association with a file system independent (i.e. regardless) of the software (e.g., a version thereof) that is used to read/write the blocks In the embodiment specifically shown in FIG. 3, an API can be used to create and populate the playlist. Such API may map various features to certain blocks that hold information required for such a feature. Thus, in various embodiments, the initiative for populating the playlist may be delegated to a storage server software developer. Further, by using such an API, the playlist may be generated without incurring the computational expense of the aforementioned recorder feature.

As shown, at 302 it is determined whether a particular feature (e.g., a snapshot, a mirror, a clone) is enabled. The foregoing exemplary features, by their nature, result in the modification (e.g., writing or moving) of corresponding blocks required during mounting. As used herein, a "snapshot" is a point-in-time image of data. In one embodiment, a snapshot includes a read-only, persistent, point-in-time image (PPI) of data, such as a storage volume or a logical unit number (LUN). Blocks that may be referenced in the playlist when a snapshot is enabled may include, for example, blocks that store snapshot files, an associated data image, etc.

Also in the context of this description, the term "clone" refers to a writeable copy of data. In one embodiment, a clone includes a writeable copy of a storage volume. Blocks that may be referenced in the playlist when a clone is enabled may include, for example, blocks that store clone files, an associated data image, etc.

As further used herein, the term "mirror" refers to a duplicate copy of data that is present in a different location than the original data. In one embodiment, a mirror includes a storage volume that contains a read-only copy of data from an active file system of another volume. Blocks that may be referenced in the playlist when a mirror is enabled may include, for example, blocks that store mirror files, an associated data image, etc.

In a storage system with mirroring capabilities, a first synchronous mode is contemplated by which data can be mirrored or replicated from a source storage server to a destination storage server. During use in such first synchronous mode, any update on the source storage server is synchronized with a mirror on the destination storage server. This may require that the source storage server and the destination storage server be equipped with the same storage operating system. The source storage server and the destination storage server each has an associated playlist. Upon each update synchronization, the destination storage server is provided with an updated playlist, reflecting the latest update.

In another embodiment, a second asynchronous mode is implemented by which snapshots of the appropriate storage volume(s) of the source storage server are transferred to the destination storage server. While this embodiment does not necessarily require the same versions of software to be running on the source and destination storage servers, the destination storage server is charged with the task of generating its own playlist. To accomplish this, the destination storage server can employ the aforementioned recorder feature to identify the appropriate playlist. Thus, this embodiment can be software version-independent, since a first version of software may be installed on a source and a second version of the software may or may not be used in association with a destination.

Figure 4:
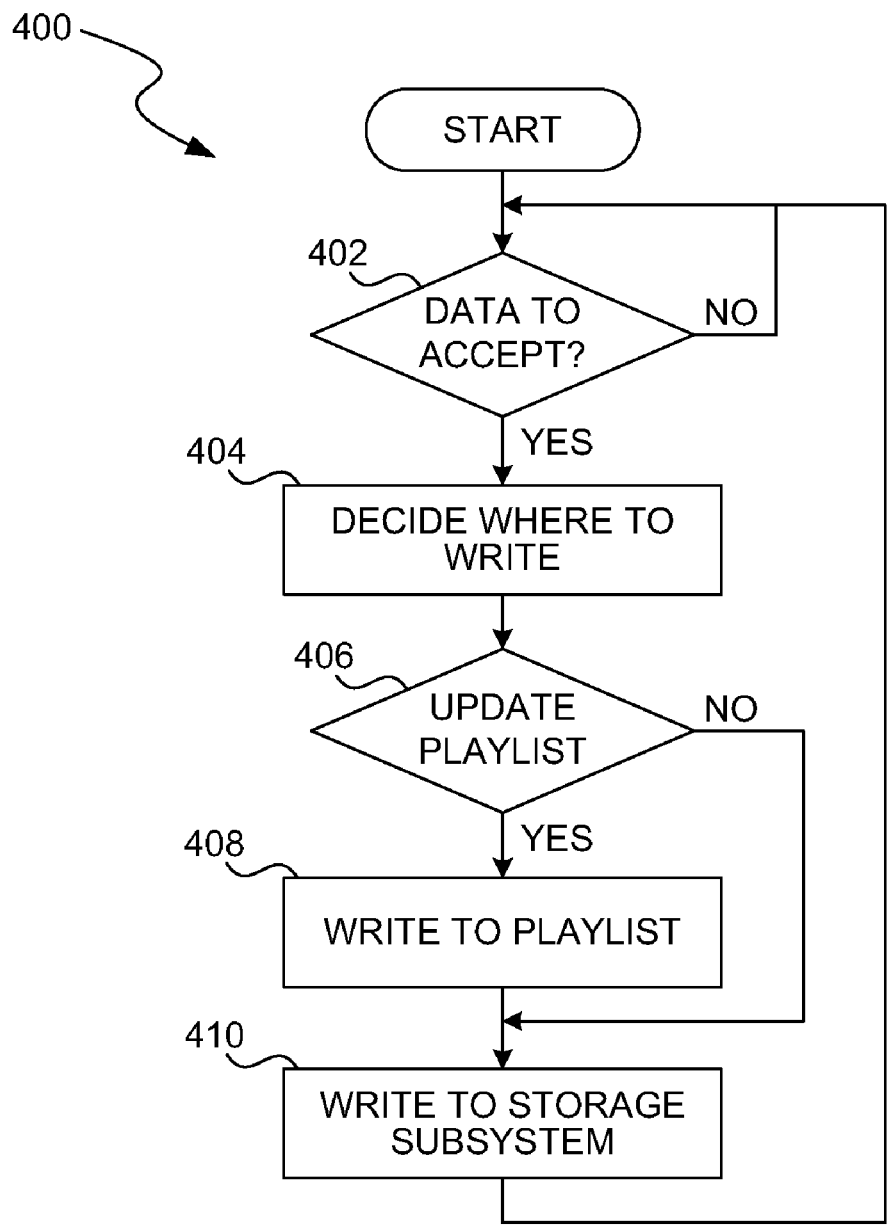
FIG. 4 illustrates a method for updating a playlist based on accepted data to be written to a physical storage device, in accordance with another embodiment.

FIG. 4 illustrates a method 400 for updating a playlist based on accepted data to be written to a physical storage device, in accordance with another embodiment. The method 400 can be carried out prior to the methods of FIGS. 1 and 2. Of course, however, it should be noted that the method 400 may be carried out in any desired environment.

As mentioned above, the playlist may be adaptive in nature after it is generated. For example, if any change (e.g., a write) in a file system results in a modification to a block referenced in the playlist (e.g., the block is moved), the playlist can be updated automatically to reflect such change. In various embodiments, such update may involve a block reference being removed from the playlist (e.g., when a corresponding block has been deleted), and/or a block reference being added/modified (e.g., when a corresponding block has been added/moved).

As shown in FIG. 4, the file system manager determines when data has been accepted for writing to a physical storage device (e.g., drive) at 402. After acceptance, the file system manager decides where to write the data at 404. The file system manager next determines whether the playlist should be updated at 406. Such determination involves an analysis of the destination and/or content associated with the write operation, to ascertain whether such write impacts one or more of the blocks that are currently referenced in the playlist. For example, a write operation may serve to move one of the blocks referenced in the playlist from a first physical location to a second physical location on the physical storage device.

As mentioned above, an API (e.g., file interest API) may be utilized in conjunction with decision 406. In such embodiment, this API may be used to identify situations where a playlist update may not necessarily be required based on any changing factors in the operating environment. For example, a previous version of an application may require a predetermined set of blocks (e.g., root directory) to be loaded when mounting, while a subsequent version does not. In such situation, the API may recognize the switch between versions and associated ramifications (e.g., the fact that the root directory is no longer required), so that the playlist need not necessarily be updated when the root directory is updated with the accepted data. If it is determined at 406 that the playlist should be updated, one or more block references is/are written to the playlist at 408. Hence, the playlist may be maintained up to date, despite changes made to a file system.

Regardless of whether the playlist is updated, the physical storage device is written with the accepted data at 410. While not necessarily shown, operation 408 may be performed coincidentally with operation 410. Hence, if any change (e.g., write) in a file system results in a modification to a block referenced in the playlist (e.g., a block is moved), such playlist may be updated to reflect such change.

Figure 5:
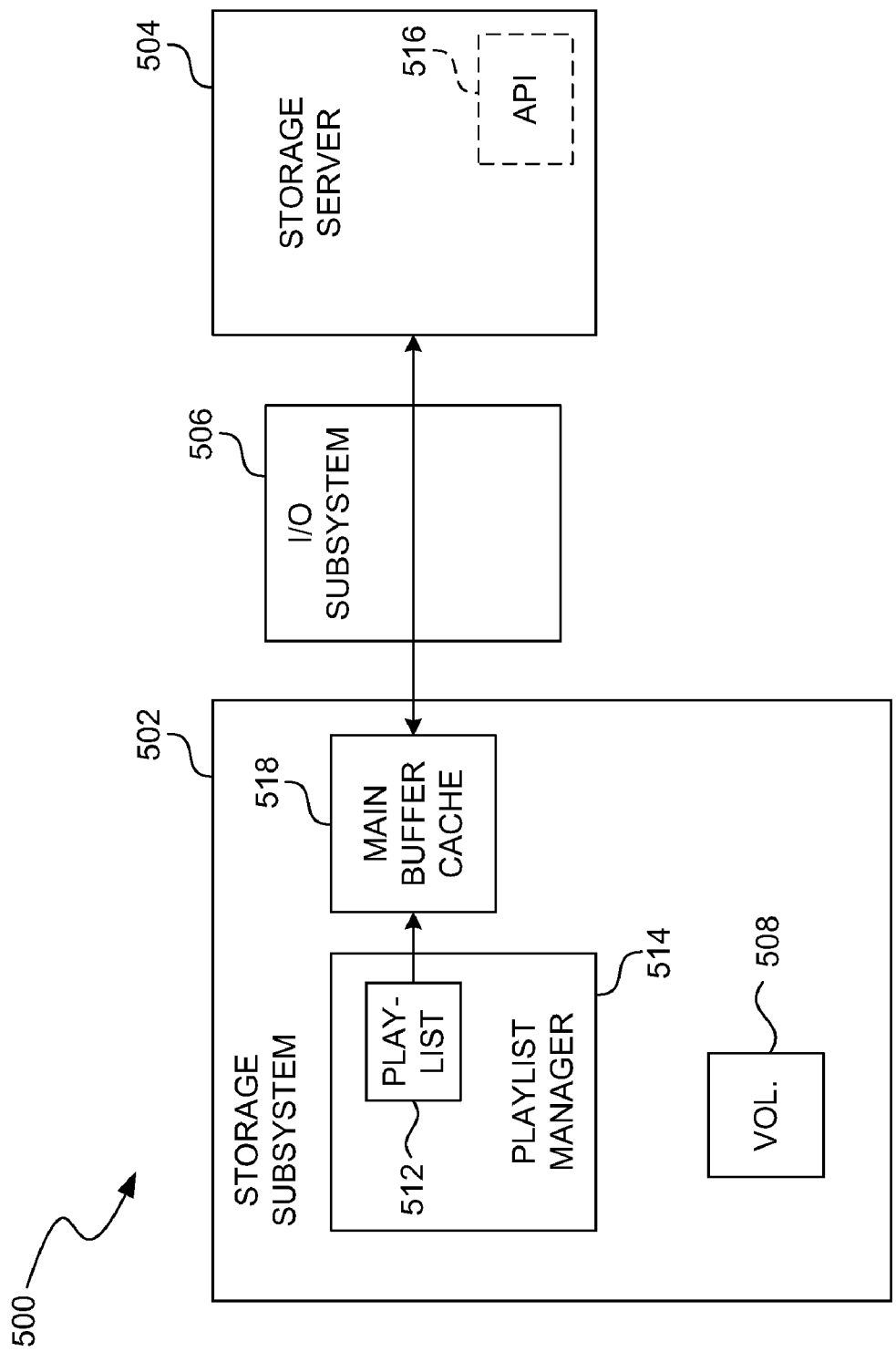
FIG. 5 illustrates a system configuration for mounting a storage volume, in accordance with another embodiment.

FIG. 5 illustrates a system configuration 500 for performing initialization operations, in accordance with an embodiment of the invention. As an option, the configuration 500 may be used to carry out the various methods of FIGS. 1 through 4. Of course, however, it should be noted that the configuration 500 may be used in any desired environment.

As shown, the configuration 500 includes a storage subsystem 502, which includes a logical aggregation of physical data storage (e.g., drives). The storage subsystem 502 communicates with a storage server 504 via an I/O subsystem 506. In one embodiment, the storage server 504 is a server that services file-level requests from storage clients. In another embodiment, the storage server 504 is a server that services block-level requests from storage clients. In yet another embodiment, the storage server 504 is a server that services both file-level requests and block-level requests from storage client.

The storage subsystem 502 includes at least one storage volume 508, and a playlist 512 (list of block references) in accordance with the above description. The playlist 512 may be a list of blocks needed to boot the storage server, to perform failover/giveback, to mount a volume, or to perform any other initialization operation. Hence, the playlist 512 may or may not be specific to a particular volume 508. Note that, while a single playlist 512 and storage volume 508 are shown in FIG. 5, a plurality of storage volumes and playlists 512 can be managed by the storage server 504, and further, each storage volume can have a corresponding volume-specific playlist 512 (e.g., for purposes of mounting the volume).

As shown, the playlist 512 may be stored outside the storage volumes 508, but yet still inside the associated storage subsystem 502. In other words, the playlist 512 may be stored on one or more drives that make up the storage subsystem 502 and that is/are further used to store the storage volume 508. Of course, other embodiments are contemplated where the playlist 512 is located anywhere inside or outside the storage subsystem 502. For example, the playlist 512 can be stored in a cache, removable memory (e.g., flash card), any high-speed memory that operates faster (i.e., has a shorter access time) than the drive(s) associated with the storage subsystem 502, external solid-state storage and/or in any accessible location, for that matter. In the embodiment shown in FIG. 5, the playlist 512 can be stored in a main buffer cache 518. Again, the main buffer cache 518 may include any memory that operates faster than the drive(s) associated with the storage subsystem 502, such as dynamic random access memory (DRAM).

Also provided is a playlist manager 514, which in some embodiments is a software module responsible for generating, updating, and/or utilizing the playlist 512 in accordance with any of the functionality described above. The playlist manager 514 can be configured to avoid any restrictions or impact on normal file system/server operation. Also, an API 516 may work in conjunction with the playlist manager 514 to interface the playlist 512 for updating the same during use. See the methods of FIGS. 3 and 4, for example. As an option, the API 516 can be made accessible at the storage server 504 in the manner shown, and/or at any other location, for that matter.

When an initialization operation is to be performed, the playlist 512 can be accessed by the playlist manager 514 and communicated to the storage server 504 via the I/O subsystem 506. The playlist 512 can be further processed for accessing blocks referenced in the playlist 512 in a predetermined order. Such accessed blocks can be stored in cache memory (e.g., main buffer cache 510). Of course, such caching of the blocks may occur at any location associated with the storage subsystem 502 and/or storage server 504, as described further below. The accessed blocks may be efficiently communicated with the storage server 504 via the I/O subsystem 506.

Figure 6:
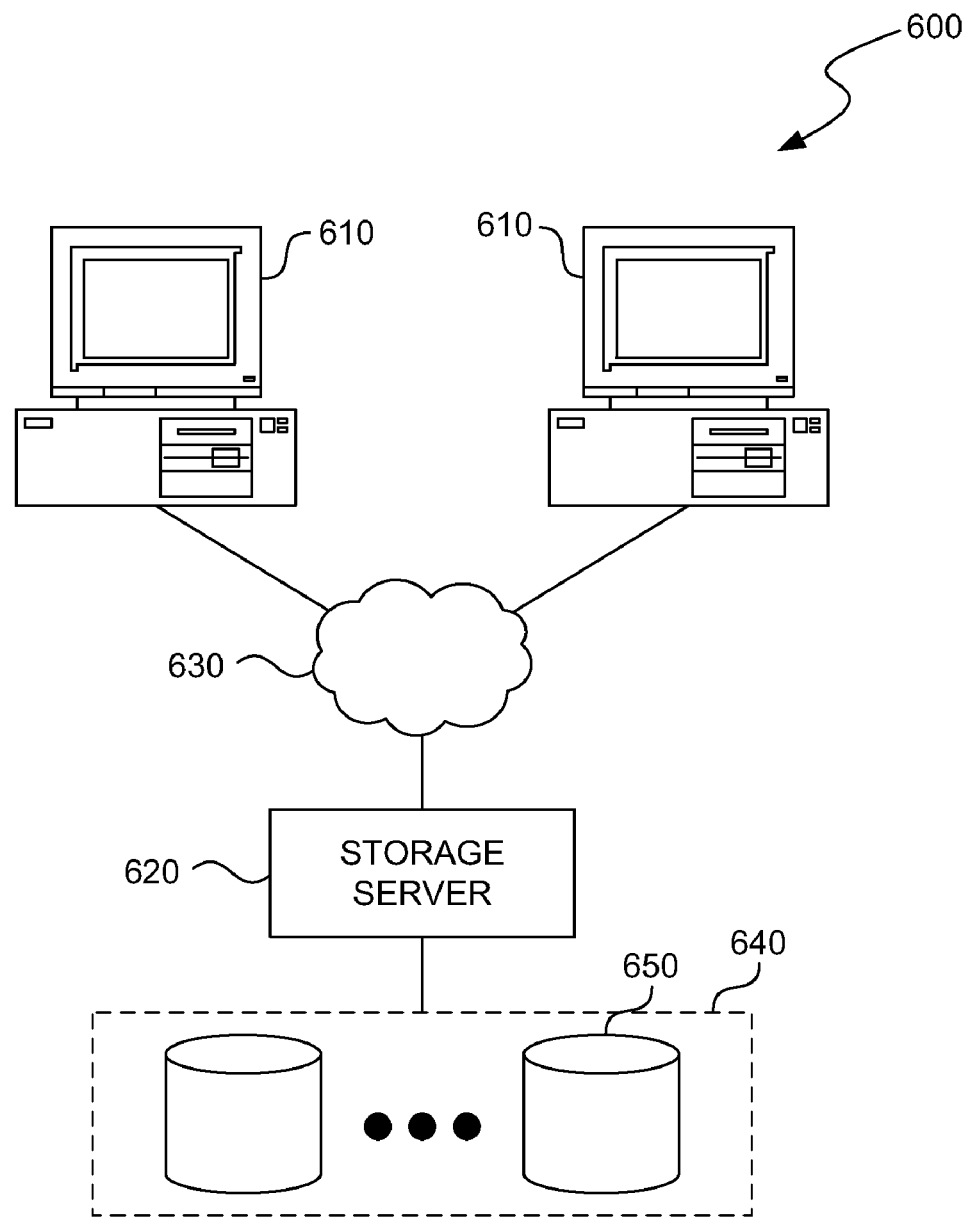
FIG. 6 is an illustration of a network environment in which an embodiment may be implemented.

FIG. 6 shows a network environment 600 in which the techniques introduced here may be implemented. The network environment 600 can incorporate the configuration 500 of FIG. 5. For example, the storage server 620 of FIG. 6 can be or include the storage server 504 of FIG. 5. Further, the storage subsystem 640 of FIG. 6 may be or include the storage subsystem 502 of FIG. 5. Of course, however, it should be noted that the network environment 600 may be used in any desired environment and incorporate any one or more of the features described in the previous figures.

The various embodiments described herein are not limited to any particular environment, and may be implemented in various storage processes. In the present illustration, the storage system 600 includes a storage server 620. The storage server 620 is coupled with a mass storage subsystem 640, which includes a set of mass storage devices 650, and to a set of clients 610 through a network 630, such as a local area network (LAN) or other type of network. Each of the clients 610 may be, for example, a conventional personal computer (PC), workstation, blade server, web server, or the like.

The mass storage subsystem 640 is managed by the storage server 620. For example, the storage server 620 may receive and respond to various read and write requests from the clients 610, directed to data stored in or to be stored in the storage subsystem 640. The mass storage devices 650 in the mass storage subsystem 640 may be, for example, magnetic drives, optical drives such as compact disks-read only memory (CD-ROM) or digital versatile/video disks (DVD)-based storage, magneto-optical (MO) storage, tape-based storage, flash based solid-state drive (SSD) or other flash based device, or any other type of non-volatile storage devices suitable for storing large quantities of data.

The storage server 620 may have a distributed architecture; for example, it may include separate N-module (network module) and D-module (data module) components (not shown). In such an embodiment, the N-module is used to communicate with the clients 610, while the D-module includes the file system functionality and is used to communicate with the storage subsystem 640. In another embodiment, the storage server 620 may have an integrated architecture, where the network and data components are all contained in a single box or unit. The storage server 620 further may be coupled through a switching fabric to other similar storage systems (not shown) that have their own local storage subsystems. In this way, all of the storage subsystems can form a single storage pool, to which any client of any of the storage systems has access.

Figure 7:
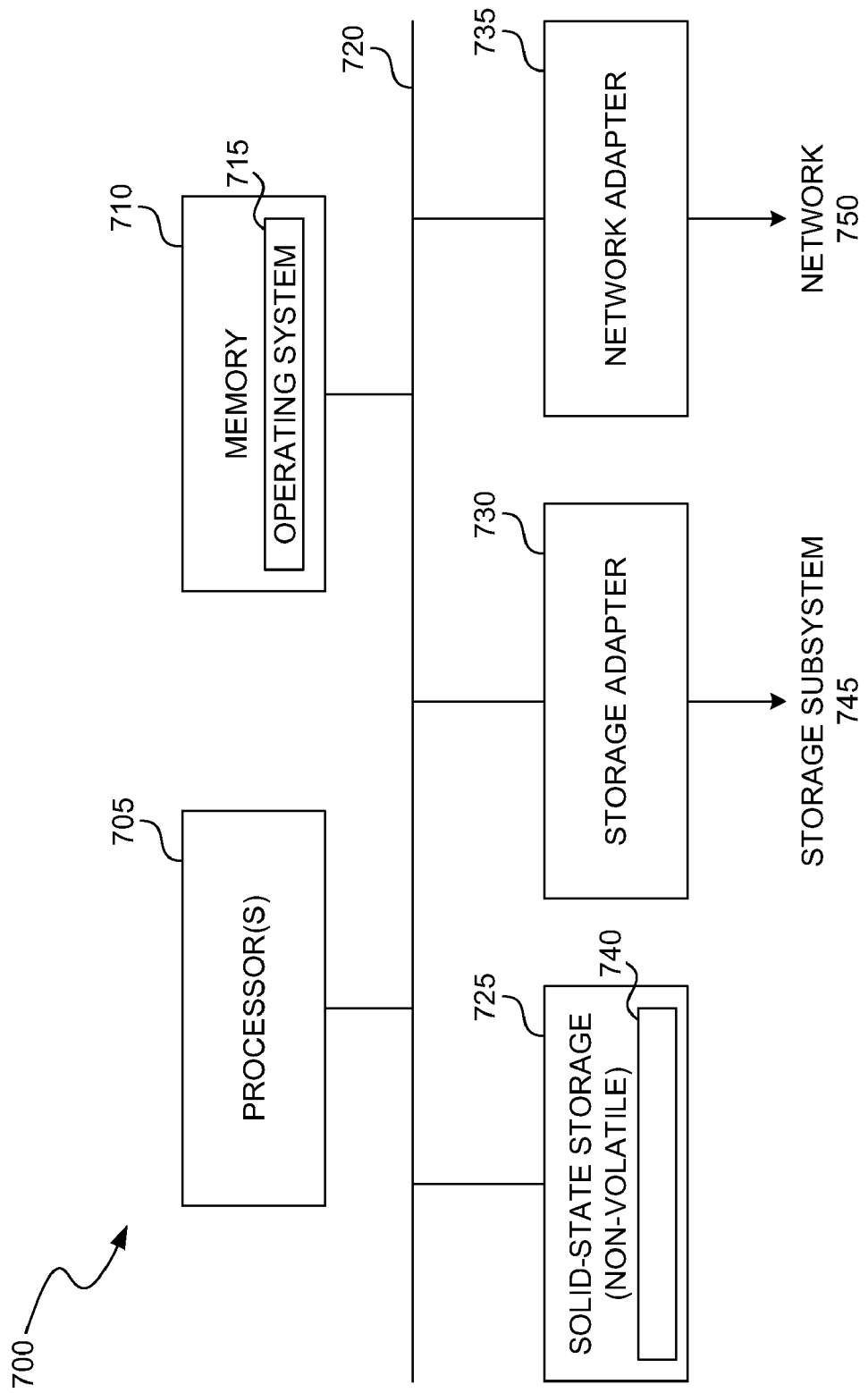
FIG. 7 is a block diagram illustrating an architecture of a storage server that may include an embodiment.

FIG. 7 is a high-level block diagram showing an example of the architecture of a storage server 700. The storage server 700 may represent the storage server 620 of FIG. 6.

The storage server 700 includes one or more processors 705 and memory 710 coupled to a interconnect 720. The interconnect 720 shown in FIG. 7 is an abstraction that represents any one or more separate physical buses, point-to-point connections, or both connected by appropriate bridges, adapters, or controllers. The interconnect 720, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 705 may include central processing units (CPUs) of the storage server 700 and, thus, control the overall operation of the storage server 700. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 is or includes the main memory of the storage server 700. The memory 710 represents any form of random access memory (RAM), read-only memory (ROM), flash memory, or the like, or a combination of such devices. In use, the memory 710 stores, among other things, the operating system 715 of the storage server 700.

Also connected to the processor(s) 705 through the interconnect 720 a storage adapter 730 and a network adapter 735. The storage adapter 730 allows the storage server 700 to access a storage subsystem 745 and may be, for example, a Fibre Channel adapter or a SCSI adapter. The network adapter 735 provides the storage server 700 with the ability to communicate with remote devices, such as clients, over a network 750 and may be, for example, an Ethernet adapter.

The storage server 700 can further include non-volatile solid-state storage 725 coupled to interconnect 720. Solid-state storage 725 may be, for example, flash-based memory, which can be a removable device. Solid-state storage 725 can be used to store information 740 representative of the blocks needed for one or more initialization operations, such as the above described playlist, the actual blocks which are needed for initialization, change data representing changes to one or more such blocks, or a logical-to-physical mapping of such blocks, etc. Since flash memories generally boot very quickly and have very fast read access times (relative to conventional drives), the properties of flash memory devices can be used advantageously to further improve the speed of initialization operations.

In some embodiments, the solid-state storage is physically attached to the main motherboard (not shown) of the storage server 700. Such a configuration can be advantageous, because it allows the solid-state storage to be accessed directly from the boot processor (e.g., processor 705) without requiring that the boot processor first initialize the mass storage subsystem before it can begin the boot sequence. This means that the system can prepare to fetch the contents of the playlist almost immediately, even before the mass storage devices come online.

In one embodiment, when the storage server boots, it reads the playlist from the flash memory device. Because the random read access speed for flash memory devices is much better than that of conventional disk drives, it is not necessary to store the playlist in a compact, highly structured form in order to minimize the number of I/O operations, and minimize the positioning delay penalty between the I/O operations required to fetch the playlist. This means that the playlist can be stored in a relatively simple manner, making it easier to keep the playlist up-to-date in a manner that is efficiently stored in solid-state memory.

Note this same concept can be applied to other kinds of initialization operations, such as failover/giveback and volume mounting, as well as to other kinds of servers and computing systems.

In other embodiments, the solid-state storage 725 is on a separate card or other physical medium within the storage server 700. In still other embodiments, the solid-state storage is external to the storage server 700, while still providing much of the speed benefit noted above. In any case, the solid-state storage may communicate with the processor 705 via any conventional type of interconnect, such as an I2C bus, for example.

Figure 8:
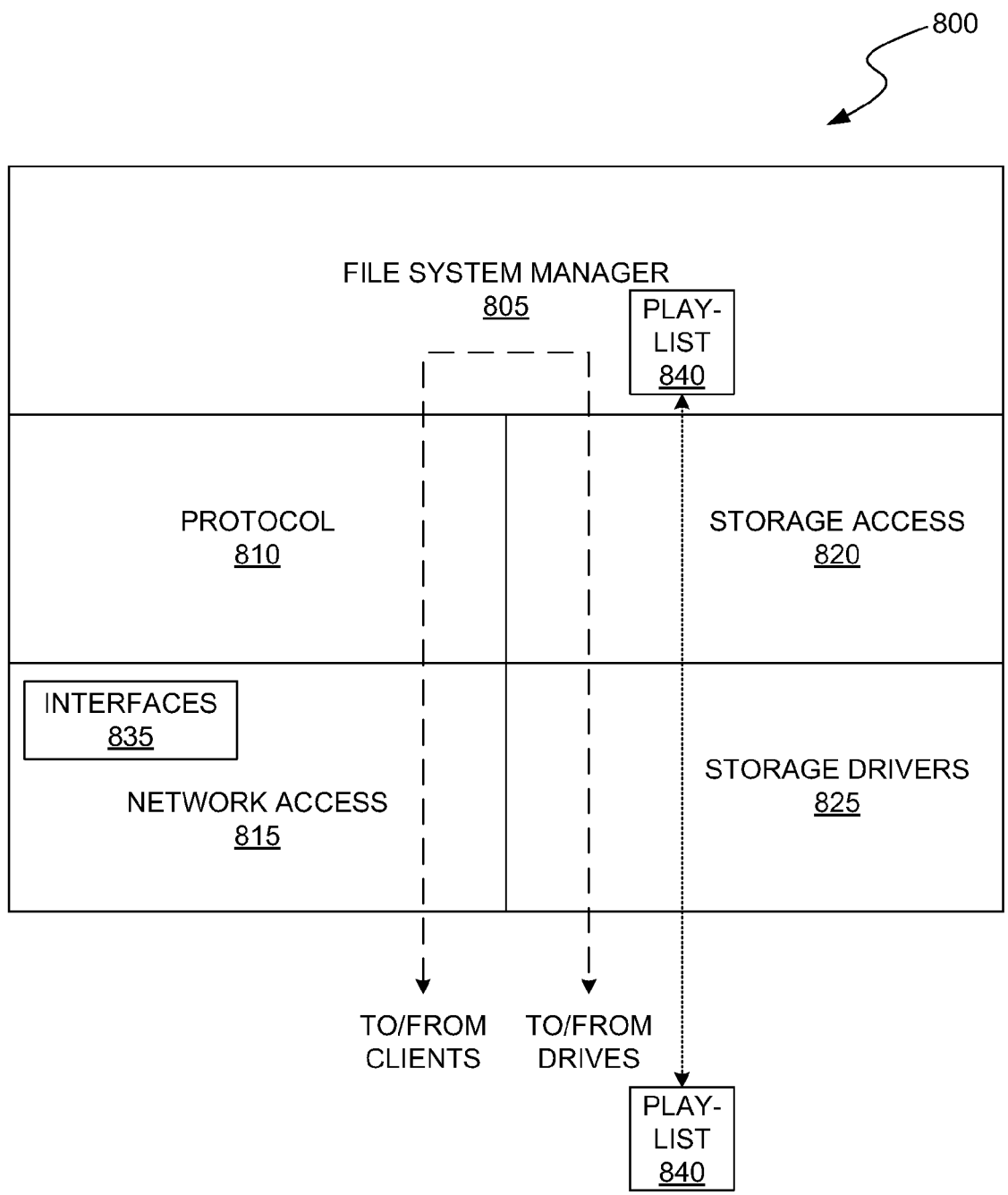
FIG. 8 illustrates an example of an operating system of a storage server according to one possible embodiment.

FIG. 8 illustrates an example of the operating system 800 of a storage server according to an embodiment of the invention. The operating system 800 can be installed in the storage server 700 of FIG. 7.

As shown, the operating system 800 includes several modules, or "layers." These layers include a file system manager 805. The file system manager 805 is software that keeps track of the directory structure (hierarchy) of the data stored in a storage subsystem and manages read/write operations on the data (i.e. executes read/write operations on the drives in response to client requests).

The operating system 800 also includes a protocol layer 810 and an associated network access layer 815, to allow a storage server to communicate over a network to other systems, such as clients. The protocol layer 810 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 815 includes one or more drivers, which implement one or more lower-level protocols to communicate over the network, such as Ethernet. Interactions between clients and mass storage devices (e.g., drives) are illustrated schematically as a path, which illustrates the flow of data through the operating system 800.

The operating system 800 further includes a storage access layer 820 and an associated storage driver layer 825 to allow a storage server to communicate with a storage subsystem. The storage access layer 820 implements a higher-level drive storage protocol, such as RAID, while the storage driver layer 825 implements a lower-level storage device access protocol, such as Fibre Channel Protocol (FCP) or SCSI. In one embodiment, the storage access layer 820 may implement a RAID protocol, such as RAID-4 or RAID-DP™ (RAID double parity for data protection provided by Network Appliance, Inc.), and therefore may alternatively be referred to as RAID layer 820.

In use, when a storage volume (e.g., storage subsystem 640 of FIG. 6) is to be mounted, a playlist 840 (e.g., playlist 512 of FIG. 5) may be communicated from the storage subsystem to the file system manager 805 via the storage access layer 820 and associated storage driver layer 825, in the manner shown. The playlist 840 may be processed by the file system manager 805 for accessing blocks referenced in the playlist in a more efficient manner such that, in various embodiments, storage volume mount duration is reduced. While the playlist 840 is shown in FIG. 8 to be originally stored at the storage system and subsequently communicated to the storage server for use by the file system manager 805, the playlist 840 may originate from any desired location and be used by any desired component for providing more efficient initialization operations.

As mentioned above, a playlist can be stored in a separate solid-state memory (e.g., flash memory), i.e., a solid-state memory which is separate from both the main buffer cache (e.g., RAM) and the main mass storage subsystem (e.g., drives) of the storage server. Similarly, the actual blocks themselves can be stored in such solid-state memory. Due to the fast boot time and read access time of flash memory, the use of a solid-state memory such as flash in this manner adds to the performance benefits provided by the basic technique of an adaptive playlist.

A refinement of this technique is to store some of the data in solid-state memory in terms of differences relative to earlier versions of the data. This technique is well-suited for storing the differences between consecutive versions of some of the data blocks referenced by the playlist. This approach is practical when the changes to a block are confined to a fraction of the block (e.g., where only a few bytes of the block are changed).

Figure 9:
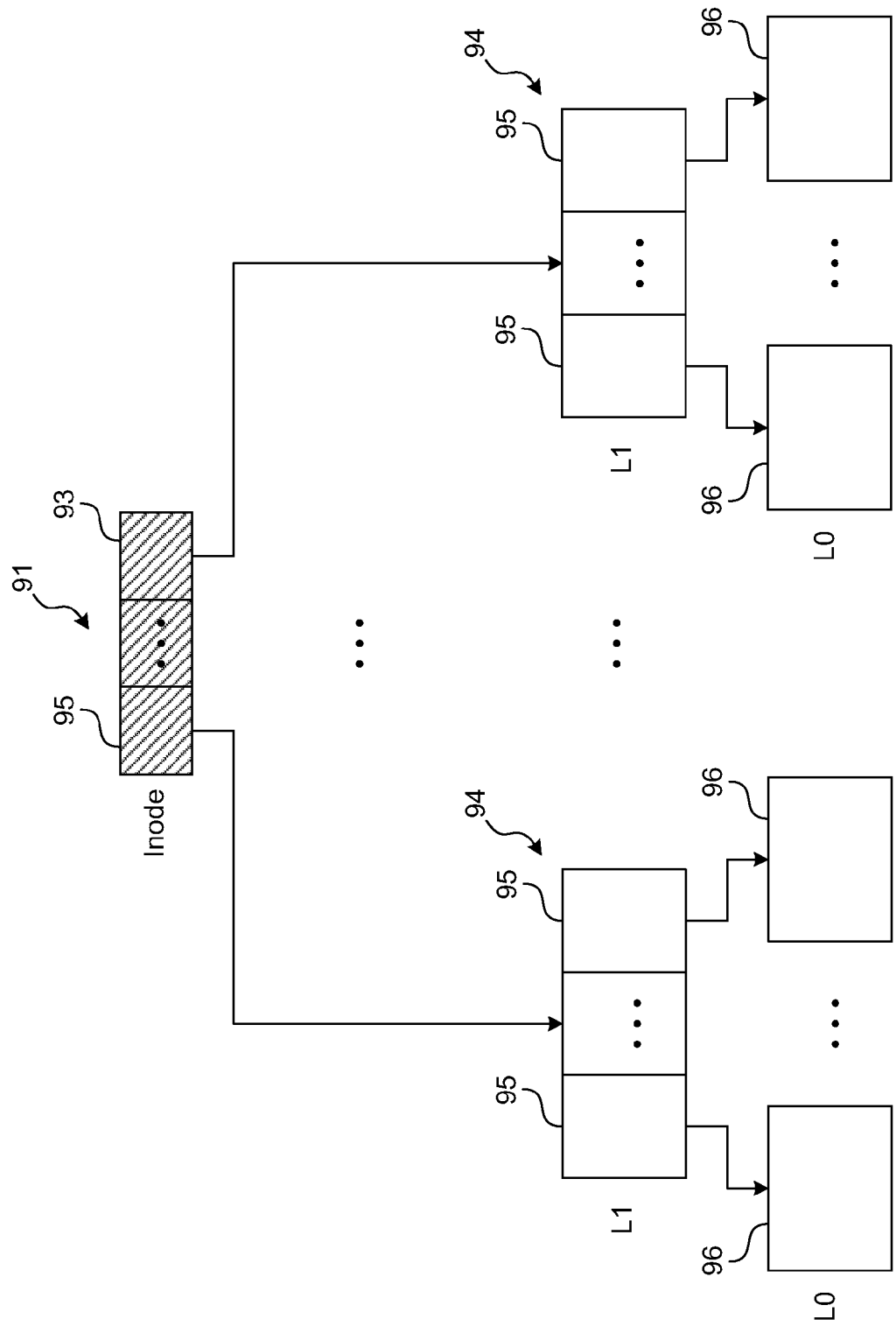
FIG. 9 shows an example of a tree hierarchy of interdependent blocks.

An example of this approach will now be described in the context of a file system that does not overwrite data in place, but instead writes new data into unoccupied blocks, as mentioned above. First, it is useful to understand the form in which such a file system may store data. Such a file system may structure blocks belonging to files and other data containers into one or more tree structures (hierarchies), an example of which is shown in FIG. 9. In the illustrated example, each file in a file system is represented by an inode 91, which is a metadata container that stores information about the file. The inode 91 forms the root of a tree structure of blocks, that collectively represent the file. All of the actual file data is contained in one or more "direct blocks" 96 (also called "Level 0 blocks" or "L0 blocks"), whereas metadata relating to the file (including block pointers) are contained in the inode 91 and (in some cases) in one or more indirect blocks 94. The information contained in an inode 91 may indicate, for example, ownership of the file, access permission for the file, size of the file, file type and references to locations of the data blocks for the file. Note that the inode may be stored as a direct block of a separate file (i.e., an inode file), but to simplify description such file is not shown.

The references to the locations of the data blocks are pointers 93 in the inode 91, which may point to actual data blocks 96 or other metadata blocks ("indirect blocks") 94, depending on the size of the file; in the tree structure shown in FIG. 9, the inode 91 points to indirect blocks. An indirect block 94 contains pointers 95 that reference the direct blocks 96 of the file or lower levels of indirect blocks, depending upon the quantity of data in the file. Each pointer 93 or 95 can be, for example, a logical block number to facilitate efficiency among the file system and the RAID system when accessing the data on drives, as opposed to a physical block number. In that case, the file system manager maintains a data structure that provides the mapping of logical blocks to physical blocks.

Thus, all of the actual file data is contained in the direct (level 0) blocks, whereas the inode and indirect blocks contain pointers to other blocks and other metadata. Note that there may be multiple levels of indirect blocks (e.g., level 1, level 2, level 3) in a tree structure, depending upon the size of the file. That is, the data of the file are contained in direct (L0) blocks 46 and the locations of these blocks are stored in the indirect (L1) blocks 44 of the file.

In at least one known file system which does not overwrite blocks in place, all of these blocks (direct and indirect) can be located anywhere in the mass storage subsystem. If a data block is modified in an ordinary file, several other blocks are normally also modified within the file system: first, every block that is an ancestor of the modified block in the tree of that file must be modified in order to create a path to the new location of the data block (and this process continues recursively, through the ancestor directories of the file, to create a path to the new version of the file). A map of free blocks and other related file system metadata structures are normally used by the file system and, if so, each needs to be updated to reflect the new block has been allocated, and that the original block is no longer the current version.

An important attribute of these changes is that they typically change only a small fraction of these blocks, and the changes can be described very succinctly. In this example, in order to change one block, all of the ancestor blocks (e.g., indirect blocks) of that block need to be modified, where each ancestor block represents an array of block pointers as described above. However, each change to a block only requires changing one block pointer entry in each array. Therefore, it may be more efficient to store in solid-state memory the changes between the current and previous versions of an indirect block that is modified (e.g., as metadata), instead of storing the modified block (the original version of the indirect block would also be retained in the solid-state memory). It is also possible to coalesce all of the changes to the ancestry of a block so that all of the changes can fit into a small set of blocks and, therefore, require a greatly reduced number of writes to solid-state memory (with increased locality) to express the change.

Further, in some embodiments it may be advantageous to store only the differences in the logical-to-physical block mappings in solid-state memory, rather than storing all of the changes to the tree. For example, it may be desirable to use this information as a cache for the mapping between logical and physical blocks. This can be particularly useful for large files, which may have multiple levels of indirect blocks. If the changes in logical-to-physical mapping are stored in solid-state memory in this manner, the physical address of a block can be retrieved much more quickly when needed than if it had to be retrieved from disk.

The technique introduced here makes it possible to greatly simplify various types of initialization procedures. Rather than fetching all of the blocks on the playlist at the earliest possible time, the system can instead "lazily" fetch the blocks from solid-state memory as they are needed, without incurring a performance penalty. Because the penalty for random access in the solid-state memory is negligible, there is no need to take special care to schedule the prefetch reads carefully.

Thus, a technique for using an adaptive playlist to facilitate initialization operations in a storage system has been described.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic drive storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a storage system, the method comprising:
    operating the storage system to provide a remote processing device with access to data stored in a storage subsystem that includes a plurality of non-volatile mass storage devices;
    prior to an initialization process associated with the storage system, identifying a plurality of blocks that will be needed for the initialization process;
    storing, in a non-volatile solid-state storage facility which is logically separate from the storage subsystem, information representative of the plurality of blocks; and
    in response to a change that modifies a block of the plurality of blocks, storing in the non-volatile solid-state storage facility metadata indicative of the change, without storing the modified block in the non-volatile solid-state storage facility; and
    accessing the information in the non-volatile storage facility to identify and retrieve the plurality of blocks to perform the initialization process, including accessing the metadata and using the metadata to identify and access the modified data block during the initialization process.

2. A method as recited in claim 1, wherein the non-volatile storage facility comprises flash-based memory.

3. A method as recited in claim 2, wherein the storage subsystem comprises storage devices which are not flash-based.

4. A method as recited in claim 2, wherein the non-volatile solid-state storage facility comprises a set of solid-state drive (SSD) devices.

5. A method as recited in claim 2, wherein the non-volatile solid-state storage facility comprises a USB flash device.

6. A method as recited in claim 2, wherein the non-volatile solid-state storage facility comprises a flash card memory device.

7. A method as recited in claim 1, further comprising using the storage subsystem and the non-volatile solid-state storage facility as separate levels in a storage hierarchy managed by the storage system, wherein the storage subsystem is used as a primary persistent storage facility and the non-volatile solid-state storage facility is used as a cache.

8. A method as recited in claim 1, wherein the initialization process is a boot process of the storage system.

9. A method as recited in claim 1, wherein the initialization process is a failover or giveback operation of the storage system.

10. A method as recited in claim 1, wherein the initialization process is a process of mounting a volume in the storage system.

11. A method as recited in claim 1, wherein storing information associated with the plurality of blocks in the non-volatile solid-state storage facility comprises:
   storing a list of references to the plurality of blocks in the non-volatile solid-state storage facility.

12. A method as recited in claim 1, wherein storing information associated with the plurality of blocks in the non-volatile solid-state storage facility comprises:
   storing said plurality of blocks in the non-volatile solid-state storage facility.

13. A method as recited in claim 1, further comprising:
   in response to a change that modifies a block of the plurality of blocks, storing in the non-volatile solid-state storage facility metadata indicative of a change in logical-to-physical block mapping that results from the change, without storing the modified block in the non-volatile solid-state storage facility; and
   accessing the metadata and using the metadata to identify and access the modified data block during the initialization process.

14. A method as recited in claim 1, wherein identifying the plurality of blocks that will be needed for the initialization process comprises either:
   using a recorder feature to track and log which block requests are made for such mounting; or
   using an API in the storage system to map a plurality of features of the storage system to particular blocks that hold information required for each said feature.

15. A method of operating a storage server, the method comprising:
   operating the storage server to provide a storage client with access via a network to data stored in a storage subsystem that includes a plurality of drive based storage devices;
   prior to an execution of a boot process of the storage server, identifying a plurality of blocks that will be needed for the boot process;
   storing, in a flash-based storage facility which is logically separate from the storage subsystem, information representative of the plurality of blocks; and
   in response to a change that modifies a block of the plurality of blocks, storing in the flash-based storage facility metadata indicative of the change, without storing the modified block in the flash-based storage facility; and
   accessing the information in the flash-based storage facility to identify and retrieve the plurality of blocks from the storage subsystem to perform the boot process, including accessing the metadata and using the metadata to identify and access the modified data block during the initialization process.

16. A method as recited in claim 15, wherein the storage subsystem comprises storage devices which are not flash-based.

17. A method as recited in claim 15, wherein the flash-based storage facility comprises a set of solid-state drive (SSD) devices.

18. A method as recited in claim 15, wherein the flash-based storage facility comprises a USB flash device.

19. A method as recited in claim 15, wherein the flash-based storage facility comprises a flash card memory device.

20. A method as recited in claim 15, further comprising using the storage subsystem and the flash-based storage facility as separate levels in a storage hierarchy managed by the storage server, wherein the storage subsystem is used as a primary persistent storage facility and the flash-based storage facility is used as a cache.

21. A method as recited in claim 15, wherein storing information associated with the plurality of blocks in the flash-based storage facility comprises:
   storing a list of references to the plurality of blocks in the flash-based storage facility.

22. A method as recited in claim 15, wherein storing information associated with the plurality of blocks in the flash-based storage facility comprises:
   storing said plurality of blocks in the flash-based storage facility.

23. A method as recited in claim 15, further comprising:
   in response to a change that modifies a block of the plurality of blocks, storing in the flash-based storage facility metadata indicative of a change in logical-to-physical block mapping that results from the change, without storing the modified block in the flash-based storage facility; and
   accessing the metadata and using the metadata to identify and access the modified data block during the initialization process.

24. A storage server comprising:
   a processor to control storage operations that enable a remote client to access data stored in a storage subsystem that includes a plurality of non-volatile mass storage devices;
   a storage interface through which to access the storage subsystem;
   a flash-based storage facility which is logically separate from the storage subsystem; and
   a file system manager to perform operations including
      prior to an initialization process associated with the storage server, identifying a plurality of blocks that will be needed for the initialization process;
      storing, in a flash-based storage facility which is logically separate from the storage subsystem, information representative of the plurality of blocks; and
      in response to a change that modifies a block of the plurality of blocks, storing in the flash-based storage facility metadata indicative of the change, without storing the modified block in the flash-based storage facility; and
      accessing the information in the flash-based storage facility to identify and retrieve the plurality of blocks to perform the initialization process, including accessing the metadata and using the metadata to identify and access the modified data block during the initialization process.

25. A storage server as recited in claim 24, wherein the storage subsystem comprises storage devices which are not flash-based.

26. A storage server as recited in claim 25, wherein the flash-based storage facility comprises a set of solid-state drive (SSD) devices.

27. A storage server as recited in claim 25, wherein the flash-based storage facility comprises a USB flash device.

28. A storage server as recited in claim 25, wherein the flash-based storage facility comprises a flash card memory device.

29. A storage server as recited in claim 24, wherein the file system manager further performs operations comprising:
   using the storage subsystem and the flash-based storage facility as separate levels in a storage hierarchy managed by the storage server, wherein the storage subsystem is used as a primary persistent storage facility and the flash-based storage facility is used as a cache.

30. A storage server as recited in claim 24, wherein the initialization process is a boot process of the storage server.

31. A storage server as recited in claim 24, wherein the initialization process is a failover or giveback operation of the storage system.

32. A storage server as recited in claim 24, wherein the initialization process is a process of mounting a volume in the storage server.

33. A storage server as recited in claim 24, wherein storing information associated with the plurality of blocks in the flash-based storage facility comprises:
   storing a list of references to the plurality of blocks in the flash-based storage facility.

34. A storage server as recited in claim 24, wherein storing information associated with the plurality of blocks in the flash-based storage facility comprises:
   storing said plurality of blocks in the flash-based storage facility.

35. A storage server as recited in claim 24, wherein the file system manager further performs operations comprising:
   in response to a change that modifies a block of the plurality of blocks, storing in the flash-based storage facility metadata indicative of a change in logical-to-physical block mapping that results from the change, without storing the modified block in the flash-based storage facility; and
   accessing the metadata and using the metadata to identify and access the modified data block during the initialization process.

36. A method as recited in claim 24, wherein identifying the plurality of blocks that will be needed for the initialization process comprises either:
   using a recorder feature to track and log which block requests are made for such mounting; or
   using an API in the storage system to map a plurality of features of the storage system to particular blocks that hold information required for each said feature.

* * * * *